(12) United States Patent
Fantappie et al.

(10) Patent No.: US 11,634,350 B2
(45) Date of Patent: Apr. 25, 2023

(54) WATER FILTER AND FILTER CARTRIDGE

(71) Applicant: PepsiCo, Inc., Purchase, NY (US)

(72) Inventors: Giancarlo Fantappie, Rancho Palos Verdes, CA (US); Steven T. Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/318,705

(22) Filed: May 12, 2021

(65) Prior Publication Data

US 2021/0387884 A1  Dec. 16, 2021

Related U.S. Application Data

(60) Provisional application No. 63/038,314, filed on Jun. 12, 2020.

(51) Int. Cl.
*B01D 15/10* (2006.01)
*B01D 61/02* (2006.01)
(Continued)

(52) U.S. Cl.
CPC ............... *C02F 9/00* (2013.01); *B01D 15/10* (2013.01); *B01D 61/027* (2013.01); *B01D 61/08* (2013.01); *B01D 63/06* (2013.01); *B01D 2311/2626* (2013.01); *B01D 2311/2638* (2013.01); *B01D 2311/2649* (2013.01); *B01D 2311/2692* (2013.01); *B01D 2313/18* (2013.01); *B01D 2313/40* (2013.01); *B01D 2313/42* (2013.01); *B01D 2313/44* (2013.01); *C02F 1/001* (2013.01); *C02F 1/281* (2013.01); *C02F 1/283* (2013.01); *C02F 1/442* (2013.01); *C02F 1/70* (2013.01); *C02F 2201/003* (2013.01);

(Continued)

(58) Field of Classification Search
CPC ...... B01D 61/027; B01D 61/08; B01D 63/06; C02F 1/281; C02F 1/283; C02F 2201/003
See application file for complete search history.

(56) References Cited

U.S. PATENT DOCUMENTS 5,762,797 A   6/1998  Patrick et al.
9,365,953 B2  6/2016  Tam et al.
(Continued)

FOREIGN PATENT DOCUMENTS

EP      3225594 A1       10/2017
KR      20170121400 A  * 11/2017  ............. B01D 27/14
WO      2017/085054 A1    5/2017

OTHER PUBLICATIONS

Raymond, M—EP3225594A1 machine translation—Mar. 9, 2017 (Year: 2017).*

(Continued)

*Primary Examiner* — Bradley R Spies
(74) *Attorney, Agent, or Firm* — Sterne, Kessler, Goldstein & Fox P.L.L.C.

(57) ABSTRACT

A water filter cartridge includes a sediment filter, a carbon filter, and a core having a tubular body with openings that allow water to flow through the core. The core defines an open central area, and the core supports the sediment filter and the carbon filter. A nanofiltration unit is arranged within the open central area of the core. The nanofiltration unit includes a tubular filter element defining a central volume, and a plurality of filaments arranged within the central volume.

21 Claims, 9 Drawing Sheets

(51) Int. Cl.
    *B01D 61/08*     (2006.01)
    *B01D 63/06*     (2006.01)
    *C02F 9/00*     (2006.01)
    C02F 1/00     (2006.01)
    C02F 1/28     (2006.01)
    C02F 1/44     (2006.01)
    C02F 1/70     (2006.01)

(52) U.S. Cl.
    CPC .. *C02F 2201/005* (2013.01); *C02F 2201/006* (2013.01); *C02F 2303/04* (2013.01)

(56) References Cited

U.S. PATENT DOCUMENTS

| | | |
|---|---|---|
| 2005/0035041 A1* | 2/2005 | Nohren, Jr. ............. C02F 1/002 210/321.89 |
| 2010/0006508 A1 | 1/2010 | Mitchell et al. |
| 2012/0145624 A1 | 6/2012 | Chang |
| 2014/0144172 A1* | 5/2014 | Shaffer ............. B01D 35/1573 210/136 |
| 2018/0348110 A1 | 12/2018 | Roy |

OTHER PUBLICATIONS

Won, Hyun Jun—KR-20170121400-A machine translation—Nov. 2017 (Year: 2017).*

International Search Report and Written Opinion of the International Searching Authority in International Application No. PCT/US2021/032008, dated Oct. 1, 2021 (17 pages).

* cited by examiner

WATER FILTER AND FILTER CARTRIDGE

CROSS-REFERENCE TO RELATED APPLICATION

This application claims the benefit of U.S. Provisional Application No. 63/038,314, filed Jun. 12, 2020, which is incorporated herein by reference in its entirety.

FIELD

Embodiments described herein generally relate to a water filter cartridge.

Specifically, embodiments described herein relate to a water filter cartridge that includes multiple filter elements for removing contaminants from water without producing wastewater.

BACKGROUND

Water contains numerous contaminants that may negatively impact the taste and the purity of the water. Water filters may be used to reduce contaminants to provide clean and better tasting drinking water. Various types of water filters exist and each type of filter may be suited for removing particular types of contaminants from water. Further, filters may provide certain flow rates and lifespans. In addition to selecting types of filters, the arrangement of the filters may also be considered in order to maximize performance of each filter. If not properly arranged, the filters may become blocked or clogged, or may become fouled or contaminated. This may cause the flow rate to decrease, and may require more frequent replacement of the filter cartridge. Thus, designing a water filter may include many considerations, such as the quality of the raw water to be filtered, the types of contaminants to be reduced, the desired water purity, the lifespan of the water filter, the desired flow rate of water through the water filter, and the size of the water filter, among other considerations.

BRIEF SUMMARY OF THE INVENTION

Some embodiments described herein relate to a water filter cartridge that includes a sediment filter, a carbon filter, and a core comprising a tubular body defining a plurality of openings configured to allow water to flow through the core, wherein the core defines an open central area, and wherein the core supports the sediment filter and the carbon filter. The water filter cartridge further includes a nanofiltration unit arranged within the open central area of the core, wherein the nanofiltration unit includes a tubular filter element defining a central volume, and a plurality of filaments arranged within the central volume.

Some embodiments described herein relate to a water filter cartridge that includes an activated alumina fiber filter, a non-woven sediment filter, and a carbon block comprising activated carbon. The water filter cartridge may further include a core that supports the carbon block, the activated alumina fiber filter, the non-woven sediment filter, and a tubular filter element including a nanofiltration media that is arranged within the tubular core, and a plurality of filaments arranged within the tubular filter element.

Some embodiments described herein relate to water filter that includes a tubular housing having a first end that is closed opposite a second end that is open, and a head removably secured at the second end of the tubular housing so as to enclose the second end, wherein the head comprises a raw water inlet and a purified water outlet. The water filter further includes a filter cartridge arranged within the tubular housing, wherein water is configured to flow into the tubular housing through the raw water inlet in a longitudinal direction of the tubular housing along an inner wall of the tubular housing, and flow through the water filter cartridge in a radial direction toward a center of the filter cartridge, and wherein the water flows out of the tubular housing in a longitudinal direction through the purified water outlet. The filter cartridge of the water filter includes a sediment filter, a carbon filter, and a nanofiltration unit comprising a tubular filter element defining a central volume, and a plurality of filaments arranged within the central volume.

In any of the various embodiments described herein, the plurality of filaments may include polyethersulfone.

In any of the various embodiments described herein, the sediment filter may include a non-woven sediment filter.

In any of the various embodiments described herein, the sediment filter may include a activated alumina fiber filter.

In any of the various embodiments described herein, the carbon filter may include a carbon block. In some embodiments, the carbon block may include catalytic carbon. In some embodiments, the carbon block may include kinetic degradation fluxion media.

In any of the various embodiments described herein, the water filter cartridge may include a filter element having boehmite fibrils.

In any of the various embodiments described herein, the water filter cartridge may further include a wrapping disposed around at least a portion of the carbon filter.

In any of the various embodiments described herein, the core may be separated from the nanofiltration unit by a gap.

In any of the various embodiments described herein, the sediment filter and the carbon filter may be arranged in a nested configuration.

In any of the various embodiments described herein, the activated alumina fiber filter may surround the non-woven sediment filter, and the non-woven sediment filter may surround the carbon block such that water flows through the activated alumina fiber filter to reach the non-woven sediment filter, and water flows through the non-woven sediment filter to reach the carbon block.

In any of the various embodiments described herein, each of the activated alumina fiber filter, the non-woven sediment filter, and the carbon block have tubular structures.

In any of the various embodiments described herein, each of the plurality of filaments may include polyethersulfone.

In any of the various embodiments described herein, the carbon block may include a wrapping around at least a portion of the carbon block.

In any of the various embodiments described herein, the carbon block may include activated carbon, catalytic carbon, and a kinetic degradation fluxion media.

In any of the various embodiments described herein, the head may include a check-valve configured to prevent backflow of water.

In any of the various embodiments described herein, the filter cartridge may be removably positioned within the tubular housing.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIG. 1 shows a perspective view of a water filter cartridge according to an embodiment.

DETAILED DESCRIPTION OF THE INVENTION

Figure 1:
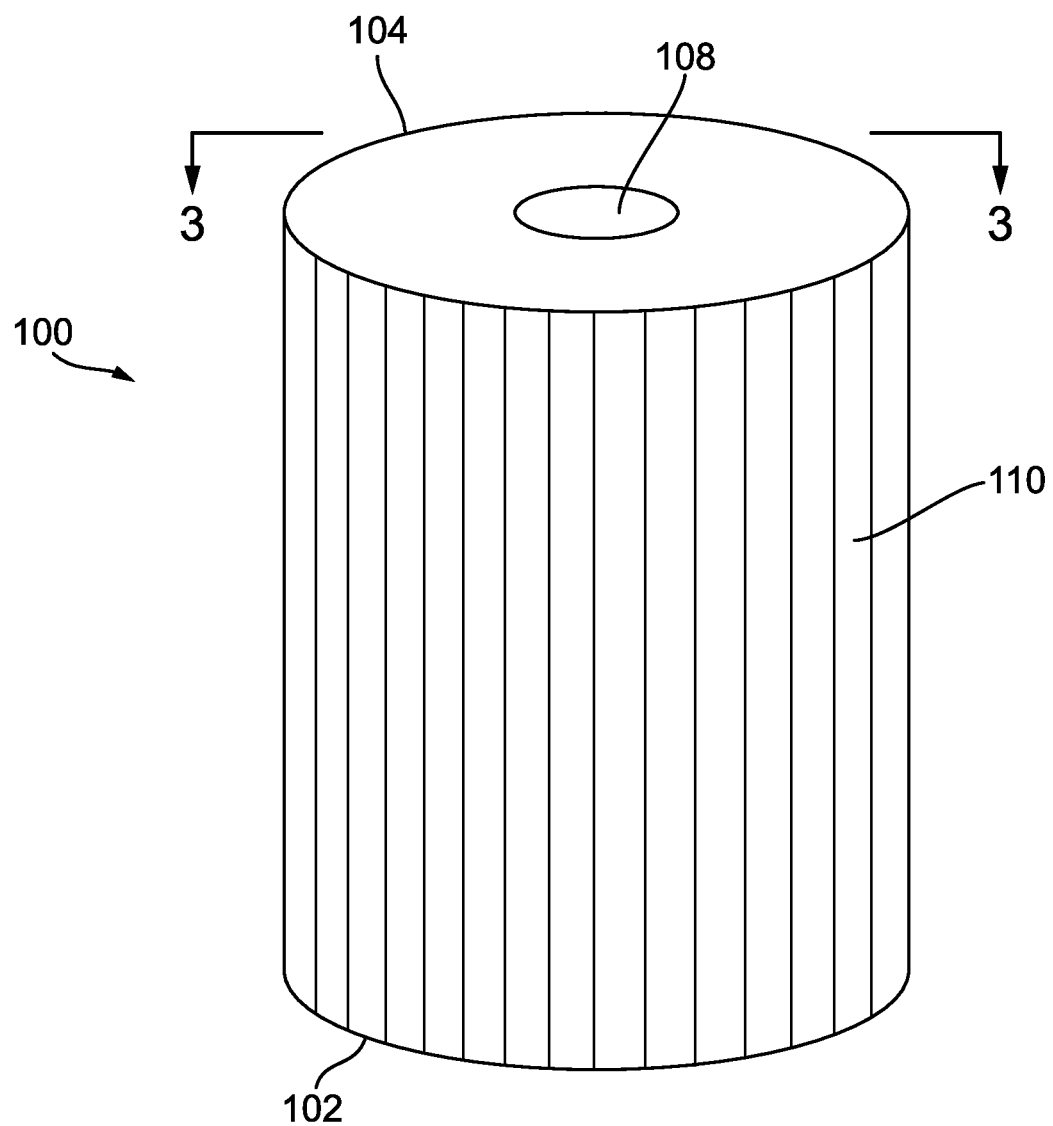

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Reverse osmosis (RO) may be used to purify water by reducing contaminants. RO reduces contaminants from water by using pressure to force the water through a semi-permeable membrane, wherein water molecules may pass through the membrane but not contaminants. While RO may allow for removal of various contaminants from water, including nanometer sized contaminants. Thus, RO may produce water with high purity.

However, RO has the drawback of producing wastewater. To provide a certain quantity of purified water, a larger quantity of raw water must be supplied to the RO purifier. Further, generating wastewater is not environmentally friendly, and the wastewater must be reduced or treated. Accordingly, there is a need in the art for a water filter that purifies water and reduces contaminants similar to RO methods, but without producing wastewater.

Further, water filters for large, commercial scale beverage fountains may not be suitable for use in smaller settings. Water filters having nanomembranes for mechanically separating nanometer sized contaminants require high pressures, e.g., 100 psi or more to force the water through the small pores of the nanomembrane. A booster pump may be required to achieve the high pressure necessary to operate the filter, which may be cumbersome and expensive. Further, the small pores of the nanomembrane may easily become clogged, and as a result the raw water must be pre-filtered to remove larger particles before the raw filter flows through the nanomembrane. As a result, such water filters which may be suitable for commercial applications, such as in a fountain beverage dispenser, may not readily be scaled down to small sizes, such as for use in filtering water in a home beverage dispenser that may be used to fill water bottles or pitchers. The ability to produce water with nanofiltration purity but without the use of a nanomembrane that mechanically removes nanometer sized particles may allow scaling of the water filter for use in different applications and would increase the convenience and usefulness of the filter design. Accordingly, there is a need in the art for filter cartridges that can be scaled for use in different applications.

Some embodiments described herein relate to a filter cartridge that includes a plurality of filter elements for removing contaminants from water. By using a plurality of filter elements, contaminants can be reduced to provide water purification similar to that achieved by reverse osmosis but without generating wastewater. Some embodiments described herein relate to a filter cartridge that is scalable for use in small, personal size beverage containers or large, commercial-scale beverage fountains.

As used herein, "raw water" may refer to water containing contaminants to be filtered or purified by a water filter.

As used herein, "purified water" may refer to water that has been filtered or purified by a water filter and from which at least some contaminants have been reduced.

As used here, "contaminants" may refer to any of various substances or matter in water, including but not limited to heavy metals, such as lead and mercury, volatile organic compounds, chlorine, chloramine, pesticides, herbicides, pharmaceuticals, particulates, colloids, polysaccharides (TEP), cysts, bacteria, legionella, e. coli, viruses, endotoxins, and dissolved salts, among others.

Filter cartridges as described herein may be scaled for use in filtering water at a flow rate of about 0.1 gallons per minute to about 5 gallons per minute. As a result, the filter cartridges may be used in any of various applications, such as for use in filtering water in water bottles, water pitchers, refrigerators, and commercial beverage fountains. For filling water bottles, the flow rate may be about 0.1 gallon per minute to about 1 gallon per minute. For commercial beverage fountains, the flow rate may be about 3 gallons per minute to about 5 gallons per minute. Raw water does not need to be pre-filtered before flowing to the filter cartridge as is necessary when using a mechanical nanofiltration membrane. Further, the raw water does not need to be supplied at high pressure, e.g., a pressure of 100 psi or more. As a result, large volumes of raw water, e.g., up to about 5 gallons per minute may be treated, and the raw water may be supplied at relatively low pressures, e.g., 30 psi to 40 psi. It is noted that when scaling the water filter cartridge to larger sizes for higher flow rates, the amount of filter media in the water filter cartridge and thus the dimensions of the water filter cartridge may be increased, but the type and arrangement of filter elements described herein may remain the same.

In some embodiments, filter cartridge 100 may include a plurality of filter elements 110, as shown in FIG. 1. Filter cartridge 100 may include a tubular structure with a center portion 108. In some embodiments, filter cartridge 100 may have a cylindrical shape. Filter cartridge 100 may include an upper end 104 opposite a lower end 102. Filter cartridge 100 may be removably arranged in a water filter housing so that filter cartridge 100 or a filter element 110 thereof may be periodically replaced.

Figure 2:
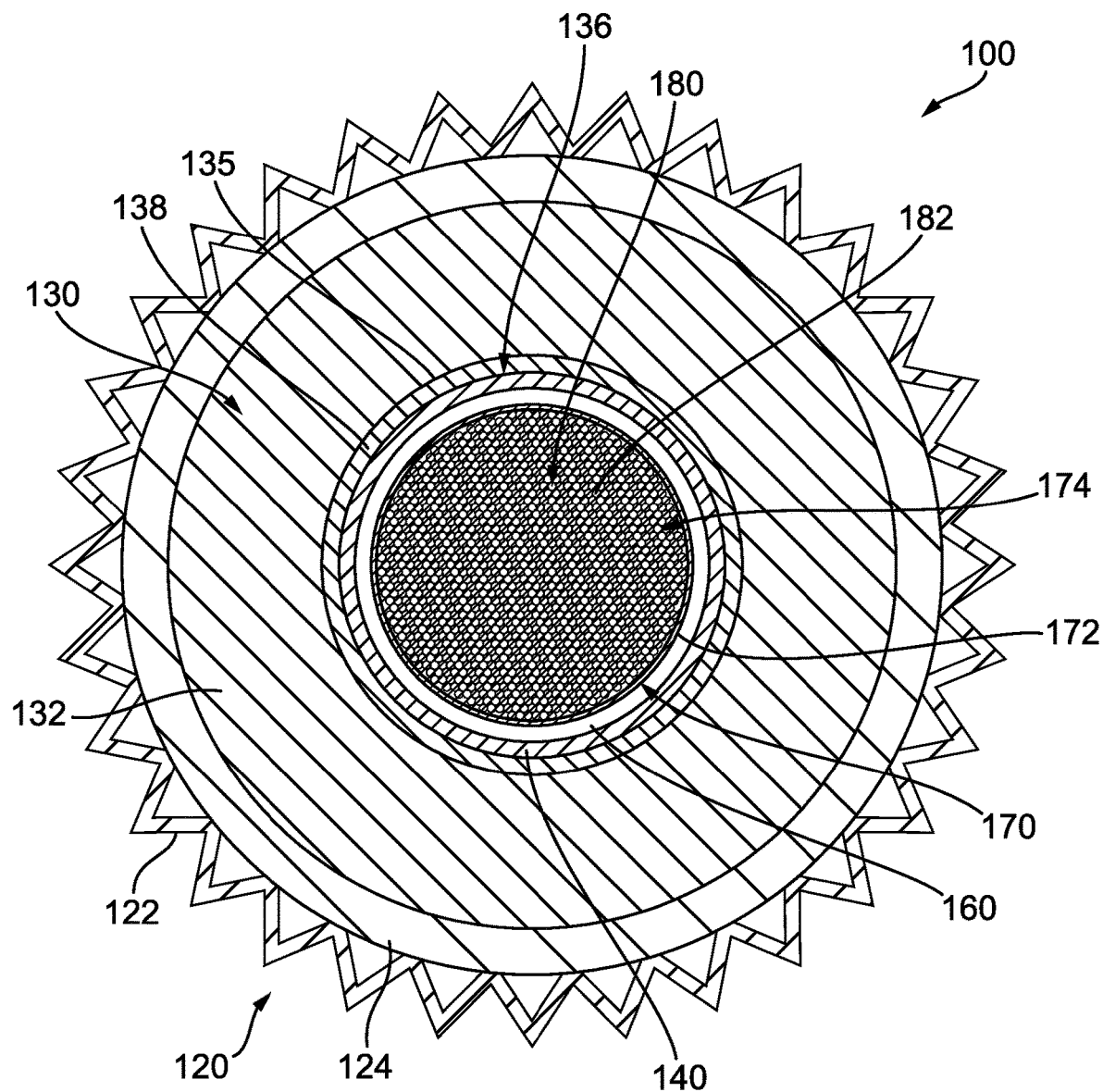
FIG. 2 shows a transverse cross sectional view of the water filter cartridge of FIG. 1.

Filter cartridge 100 may include a plurality of filter elements 110, as shown in FIG. 2.

Each filter element 110 may be configured to reduce one or more contaminants from raw water supplied to filter cartridge 100. In some embodiments, multiple filter elements 110 may be configured to reduce the same type of contaminant. However, each filter element 110 may be configured to reduce a different contaminant or contaminants from raw water.

Filter elements 110 may each have a generally tubular shape, with the exception of filter element 180 arranged at a center of filter cartridge 100. Each filter element 110 may have an annular cross sectional area (see, e.g., FIG. 2). Filter elements 110 may be arranged in a nested configuration, such that a first tubular filter element is surrounded by a second tubular filter element, and the second tubular filter element is surrounded by a third tubular filter element, etc. In this way, the raw water may flow through each filter element 110 in the order in which the filter elements 110 are arranged. For example, in FIG. 2, water may flow through the filter elements 110 in a direction from an exterior of the filter cartridge 100 toward a center of the filter cartridge 100, from filter element 122 to filter element 124, and from filter element 124 to filter element 130, etc. In some embodiments, filter elements 110 may be arranged concentrically. In some embodiments, filter elements 110 may be arranged to reduce progressively smaller contaminants.

In some embodiments, filter cartridge 100 may include a sediment filter 120, a carbon filter 130, and a nanofiltration unit 170. However, in some embodiments, filter cartridge 100 may include fewer or additional filter elements 110.

Filter cartridge 100 may include a sediment filter 120. Sediment filter 120 may include one or more filter elements 110. In some embodiments, sediment filter 120 may mechanically filter contaminants larger than a predetermined sized from the raw water supplied to the filter cartridge 100. In some embodiments, sediment filter 120 may reduce contaminants chemically, such as via electrostatic adsorption.

In some embodiments, sediment filter 120 may include an activated alumina fiber filter 122. The activated alumina fiber filter 122 may be used to electrostatically and chemically reduce contaminants in the raw water, such as cysts, bacteria, traces of arsenic, and fluoride, from the raw water. Activated alumina fiber filter 122 may also provide mechanical reduction of contaminants based on size. In some embodiments, activated alumina fiber filter 122 may be pleated. Activated alumina fiber filter 122 may be the outermost filter element of filter cartridge 100 such that raw water supplied to filter cartridge 100 first passes through the activated alumina fiber filter 122. In some embodiments, sediment filter 120 may alternatively or additionally include a non-woven sediment filter 124. Non-woven sediment filter 124 may be configured to mechanically reduce particulate matter from water. In some embodiments, non-woven sediment filter 124 may be configured reduce contaminants having a size that is greater than about 10 µm from the raw water. Thus, contaminants larger than 10 µm may not pass through the non-woven sediment filter 124.

In some embodiments, sediment filter 120 of filter cartridge 100 may include both an activated alumina fiber filter 122 and a non-woven sediment filter 124, as shown in FIG. 2. In such embodiments, non-woven sediment filter 124 may be surrounded by activated alumina fiber filter 122 such that water flows through activated alumina fiber filter 122 in order to reach non-woven sediment filter 124. Activated alumina fiber filter 122 and non-woven sediment filter 124 may be arranged concentrically, and may be in contact with one another. Activated alumina fiber filter 122 may chemically reduce contaminants and sediment filter 124 may mechanically reduce particulate matter having a size of about 10 µm or greater.

Filter cartridge 100 may further include a carbon filter 130. Carbon filter 130 may be configured to reduce volatile organic compounds, chlorine, and chloramine, among other contaminants. Carbon filter 130 may reduce contaminants in raw water chemically. In some embodiments, carbon filter 130 may be configured to reduce contaminants having a size of about 0.5 µm or larger.

Carbon filter 130 may be surrounded by sediment filter 120. Carbon filter 130 may be arranged concentrically with sediment filter 120, and carbon filter 130 and sediment filter 120 may be in contact with one another. Sediment filter 120 may help to prevent relatively large contaminants from reaching carbon filter 130 to prevent carbon filter 130 from becoming clogged or fouled, reducing the life and efficiency of carbon filter 130.

Carbon filter 130 may include a carbon block 132. Carbon block 132 may have a tubular shape and define an open central volume 136. Carbon block 132 may include activated carbon, catalytic carbon, kinetic degradation fluxion (KDF) media, or a combination thereof. Catalytic carbon may help to reduce chloramines and hydrogen sulfide from the water. KDF media may be a zinc-copper mixture, such as KDF-55. KDF media may allow carbon filter 130 to reduce chlorine and heavy metals, such as lead and mercury, and may have antibacterial effect. As a result, KDF media may help to improve the life and function of carbon filter 130. In some embodiments, carbon filter 130 may include 60% activated carbon, 30% catalytic carbon, and 10% KDF-55. However, the proportion of the components may be adjusted depending on the level of chloramine in the raw water. A strong positive charge may be created by addition catalytic carbon and KDF-55, which may help to promote adsorption of negatively charged contaminants.

Carbon filter 130 may include a wrapping 138 around at least a portion thereof.

Wrapping 138 may be arranged on an inner surface 135 of carbon filter 130 that defines the open central volume 136 of carbon filter 130. In some embodiments, wrapping 138 may include polypropylene. Wrapping 138 may help to prevent carbon particles from carbon filter 130 from passing to nanofiltration unit 170 of filter cartridge 100, described in further detail below, which may cause blockage of nanofiltration unit 170. Wrapping 138 may mechanically block particulate from carbon filter 130 from passing to nanofiltration unit 170.

Figure 4:
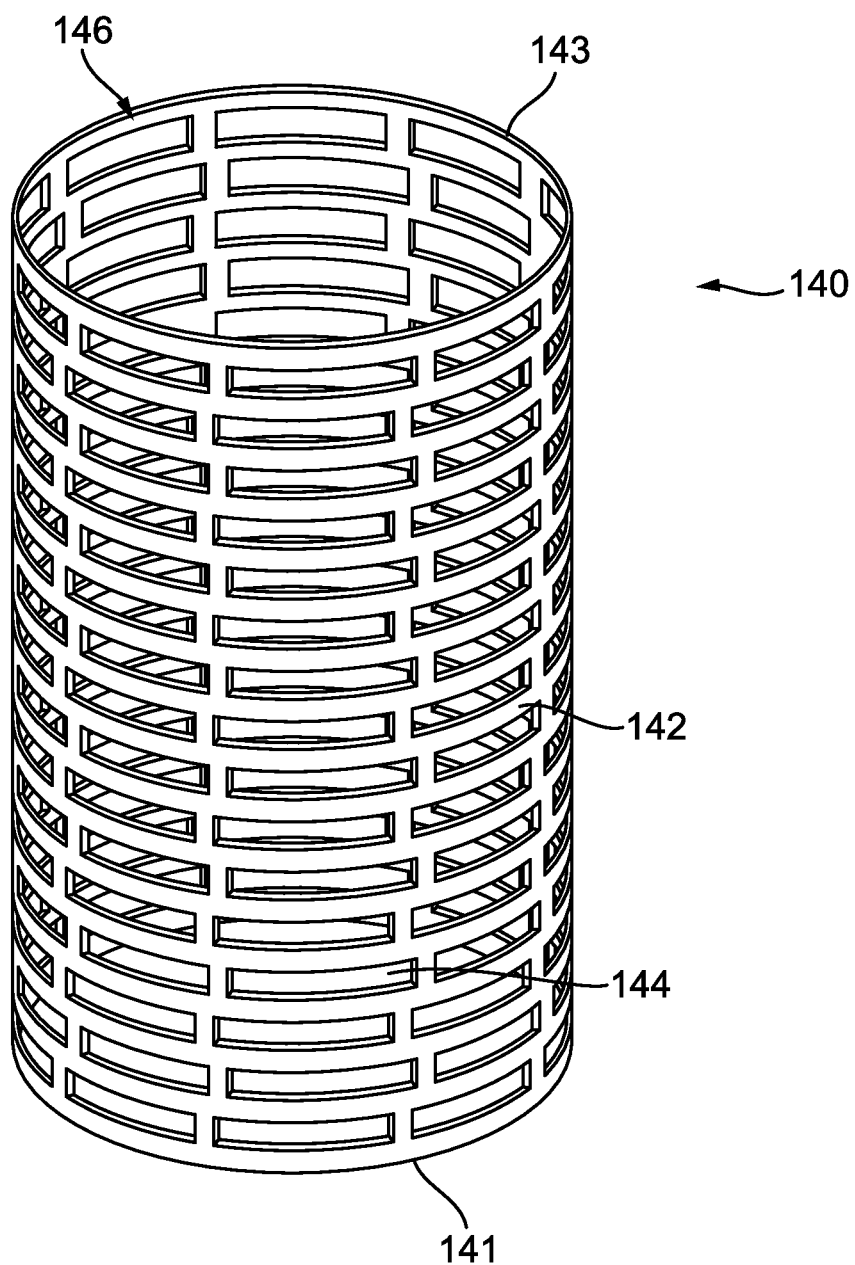
FIG. 4 shows a perspective view of a core of a water filter cartridge according to an embodiment.

Filter cartridge 100 may include a core 140 configured to provide structural support and stability to filter elements 110 of filter cartridge 100, as shown in FIG. 4. Core 140 may be in contact with carbon filter 130 in order to support carbon filter 130. In some embodiments, core 140 may have a tubular construction and may be cylindrical. Core 140 may include a body 142 having a first end 141 opposite a second end 143. First end 141 and second end 143 may each be open. Body 142 of core 140 may define a plurality of openings 144. Openings 144 may be large so as to allow free flow of water therethrough and create minimal pressure drop. In some embodiments, openings 144 may be generally rectangular in shape. Body 142 of core 140 may be at least about 80% open, at least about 85% open, or at least about 90% open. If the body 142 of core 140 is not open, body 142 may block the filter media, resulting in some portions of the filter media not being used efficiently and resulting in formation of preferential flow paths through filter cartridge 100. As the amount or size of openings 144 increases, the more freely water may flow. However, increasing the number or size of openings 144 may negatively impact the rigidity of core 140 and the ability of core 140 to provide structural support to filter elements 110.

Filter cartridge 100 may further include a nanofiltration unit 170. Nanofiltration unit 170 may be arranged within core 140 (see, e.g., FIGS. 2-3). Nanofiltration unit 170 may be configured to reduce submicron particulates, organic acids, viruses, bacteria, cysts, cell debris, and traces of pharmaceuticals, herbicides, pesticides, from water. Nanofiltration unit 170 may reduce such contaminants chemically. Water may already be free of various larger contaminants when the water reaches the nanofiltration unit 170 due to sediment filter 120 and carbon filter 130. Removing large contaminants before reaching nanofiltration unit 170 is important to prevent blockage or fouling of nanofiltration unit 170 by such large contaminants, which may decrease flowrate and negatively impact the lifespan of filter cartridge 100.

Nanofiltration unit 170 may be spaced from carbon filter 130 and core 140 by a gap 160. Gap 160 may facilitate flow of water around nanofiltration unit 170 so that nanofiltration unit 170 is not blocked by body 142 of core 140 or by other filter elements 110, allowing water to pass through any portion of nanofiltration unit 170. This may help to promote efficient use of the filter media.

Figure 5:
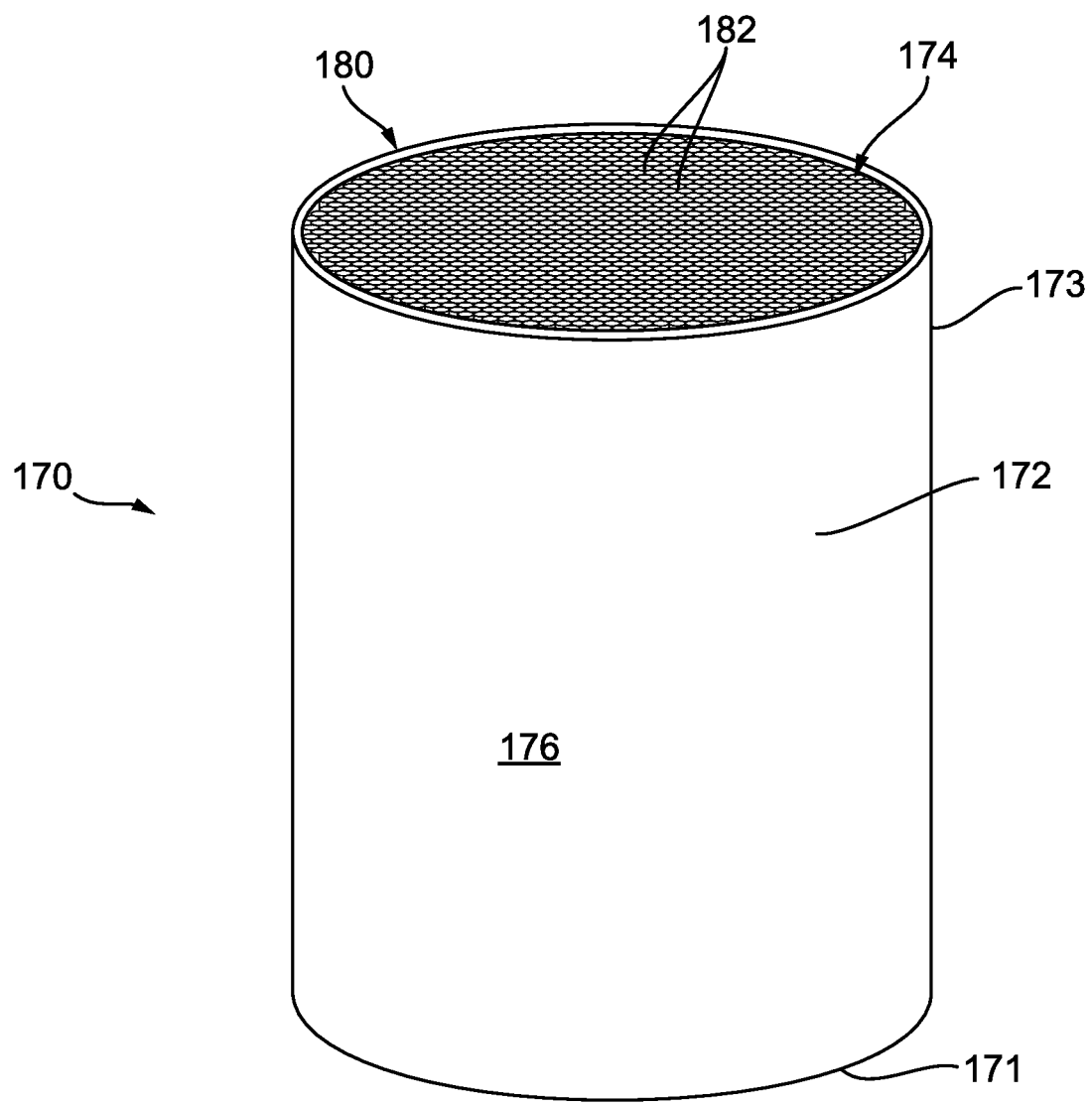
FIG. 5 shows a perspective view of the nanofiltration unit of a water filter cartridge according to an embodiment.

In some embodiments, nanofiltration unit 170 may include a tubular filter element 172 and/or a plurality of filaments 182, as shown in FIG. 5. Tubular filter element 172 may have an upper end 173 opposite a lower end 171. Each end 171, 173 may be open. Water may flow through an outer surface 176 of tubular filter element 172 into a central volume 174 of tubular filter element 172. Tubular filter element 172 may include a nanofiltration filter media. In some embodiments, tubular filter element 172 is a non-woven material. In some embodiments, tubular filter element 172 may include a Disruptor® filter media, as is commercially available from Ahlstrom. In some embodiments, tubular filter element 172 may include a Disruptor® material with silver. Tubular filter element 172 may include cationic boehmite (AlO(OH)) fibrils attached to glass microfibers. This combination of materials may allow tubular filter element 172 to mechanically separate particles with its fine-fiber structure and may also separate contaminants by electrokinetic attraction. The addition of silver and activated carbon may provide tubular filter element 172 with antimicrobial properties to inhibit bacterial growth. Thus, tubular filter element 172 may reduce contaminants by mechanical separation by size, anti-microbial action, adsorption, and electrokinetic attraction. Tubular filter element 172 may be configured to reduce contaminants by chemical and electrostatic forces, as tubular filter element 172 may carry a positive charge which attracts negatively charged submicron contaminants. Particularly, tubular filter element 172 may be configured to reduce submicron particulate, organic acids, viruses, bacteria, cysts, cell debris and pharmaceuticals from water. In some embodiments, tubular filter element 172 may be relatively thin and may have a maximum thickness of about 1 mm.

Figure 3:
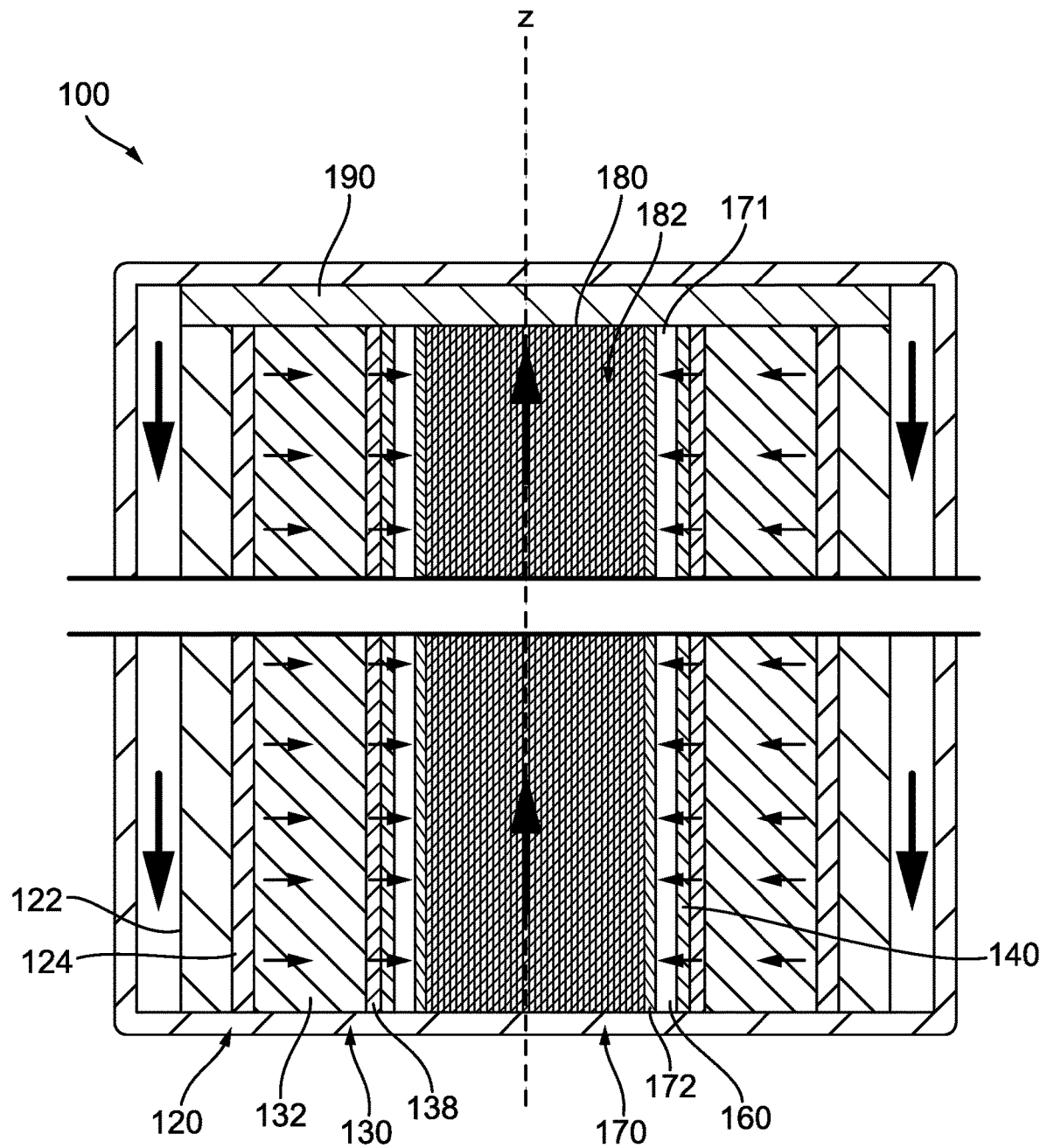
FIG. 3 shows a longitudinal cross sectional view of the filter cartridge of FIG. 1 taken along line 3-3 in FIG. 1.

Tubular filter element 172 may define a central volume 174 in which a filter element 180 is arranged. Filter element 180 may include a plurality of filaments 182. Filaments 182 may be aligned along a longitudinal axis Z of filter cartridge 100, as shown in FIG. 3. In some embodiments, filaments 182 may be formed of polyethersulfone (PES). The plurality of filaments 182 may have a large surface area to increase filtration capacity. In some embodiments, the surface area may be about 350 to 500 $m^2/g$. Filaments 182 may have a positive charge such that negatively charged contaminants adsorb to a surface of filaments 182. In some embodiments, fibers may have an average diameter of 0.1 microns to 0.01 microns.

In some embodiments, filter cartridge 100 may further include an outlet filter 190 at first end 171 of tubular filter element 172, as best shown in FIG. 3. Outlet filter 190 may be configured to mechanically filter sediment having a predetermined size, such as about 5 microns or greater. Thus, as water flows in central area of filter cartridge 100 along longitudinal axis Z and along filaments 182, water must pass through outlet filter 190 to escape filter cartridge 100. In some embodiments, outlet filter 190 may include polypropylene.

Figure 6:
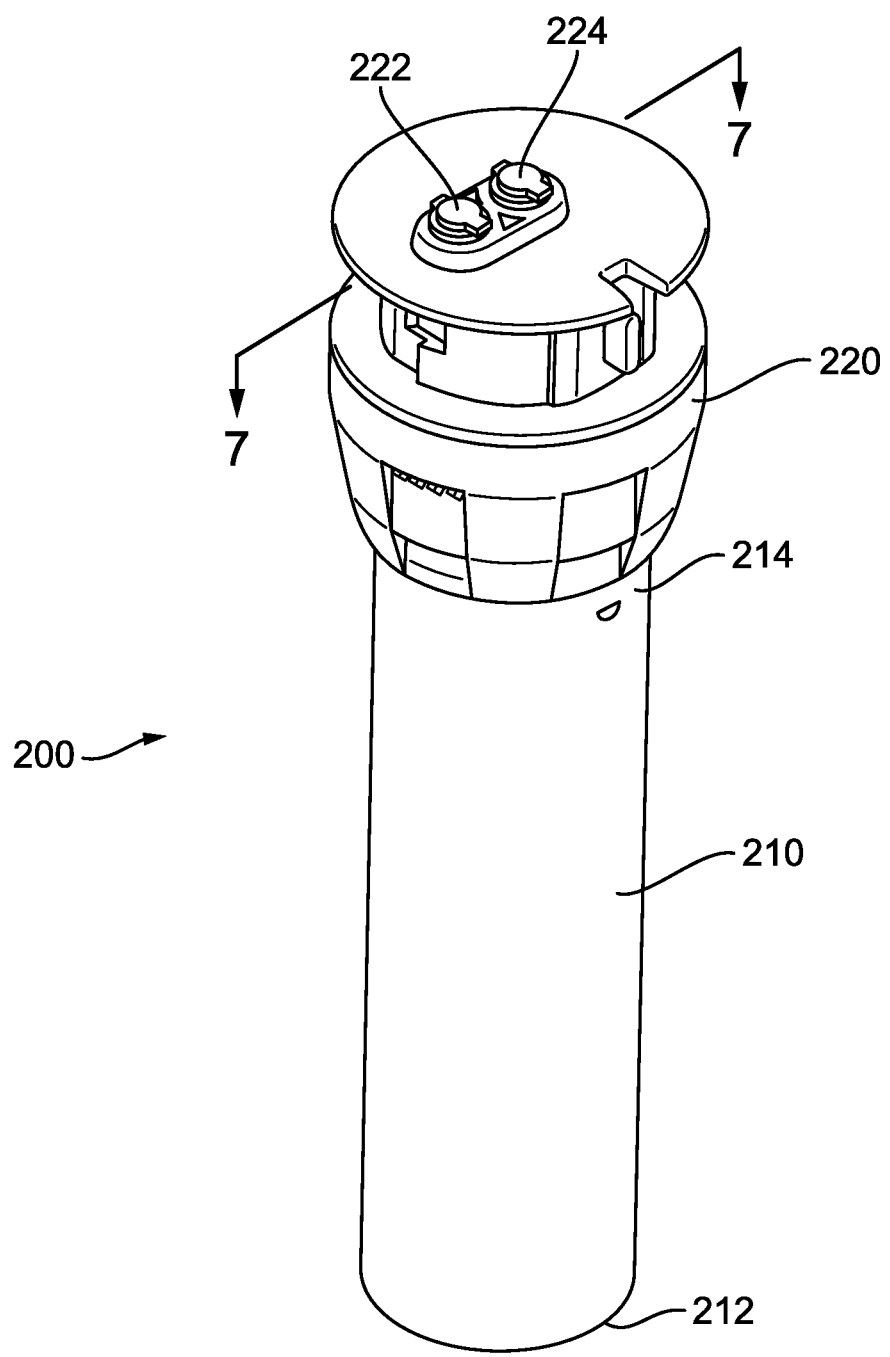
FIG. 6 shows a perspective view of a water filter according to an embodiment.
Figure 7:
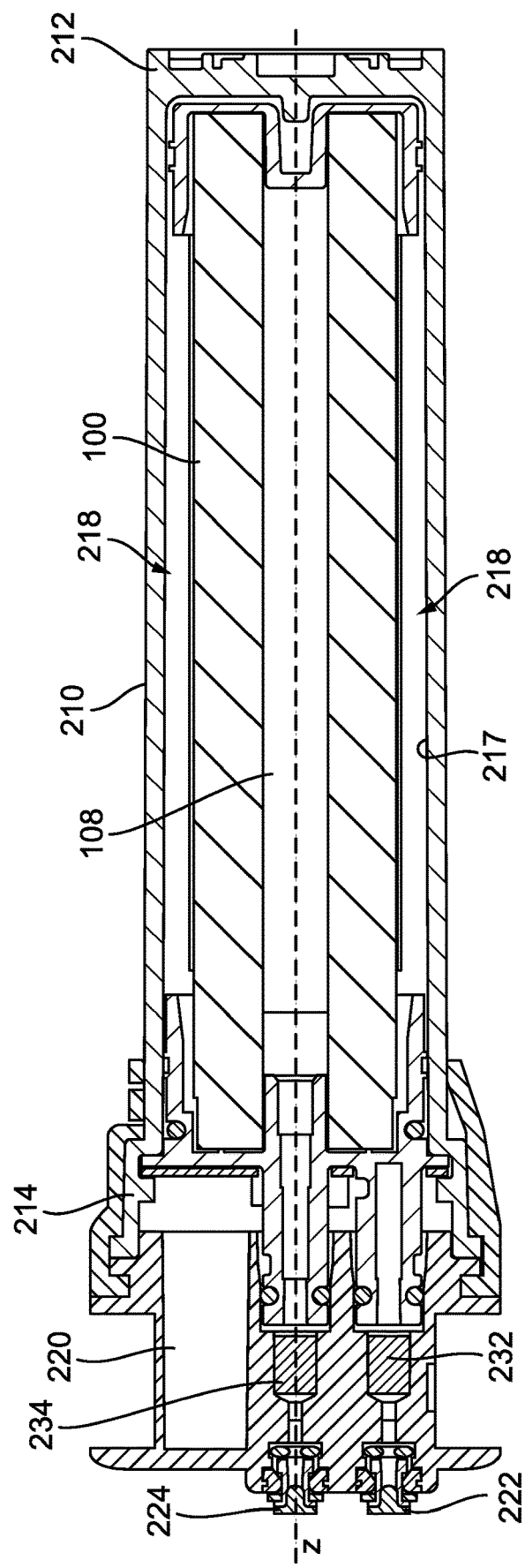
FIG. 7 shows a cross sectional view of the water filter of FIG. 6 as taken along line 7-7 in FIG. 6.

Some embodiments descried herein relate to a water filter 200 for filtering water, as shown for example in FIGS. 6 and 7. Water filter 200 includes a filter housing 210 configured to house a filter cartridge, such as filter cartridge 100, as described herein. Filter housing 210 may have a tubular shape, and may be cylindrical. Filter housing 210 may include a first end 212 that is closed opposite a second end 214 that is open. A head 220 may be arranged at second end 214 of filter housing 210 and encloses the open second end 214 of filter housing 210. Head 220 includes a raw water inlet 222 and a purified water outlet 224, such that water may only enter and exit water filter 200 via inlet 222 and outlet 224.

Filter housing 210 may enclose a filter cartridge 100 as described above. As shown in FIG. 7, filter cartridge 100 may be arranged within filter housing 210. Cartridge 100 may be removably securable within filter housing 210 so that cartridge 100 may be replaced. Cartridge 100 may be arranged spaced from inner wall 217 of filter housing 210 so as to define a flow channel 218 between cartridge 100 and inner wall 217 of filter housing 210. Thus, raw water to be filtered may enter filter 200 via raw water inlet 222 and flow through head 220 into flow channel 218 from first end 212 of filter housing 210 toward second end 214. Water may then flow radially inward through filter cartridge 100 in a direction perpendicular to a longitudinal axis Z of filter cartridge 100 and water filter 200. At a center portion 108 of filter cartridge 100, water may flow in a longitudinal direction from second end 214 toward first end 212. Water flows from center portion 108 of filter cartridge 100 through head 220 and out from water filter 200 via purified water outlet 224. Thus, no wastewater is generated and all water that flows through raw water inlet 222 exits via purified water outlet 224.

In some embodiments, as shown in FIG. 7, water filter 200 may include one or more check valves 232, 234. A first check valve 232 may be arranged in communication with raw water inlet 222, and a second check valve 234 may be arranged in communication with purified water outlet 224. Check valves 232, 234 may be configured to prevent backflow of water through water filter 200. Check valves 232, 234 may be configured to automatically close when filter housing 210 is removed. In this way, check valves 232, 234 may help to prevent water leakage when filter housing 210 is changed.

Figure 8:
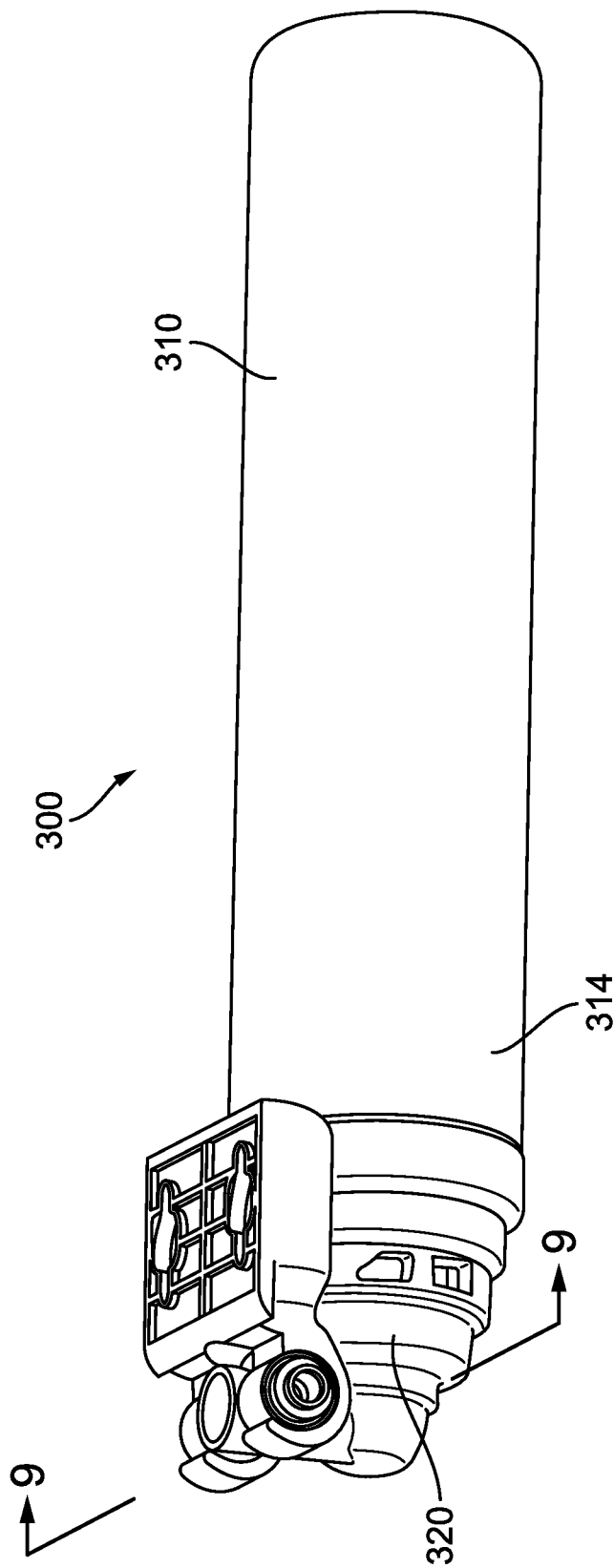
FIG. 8 shows a perspective view of a water filter according to an embodiment.
Figure 9:
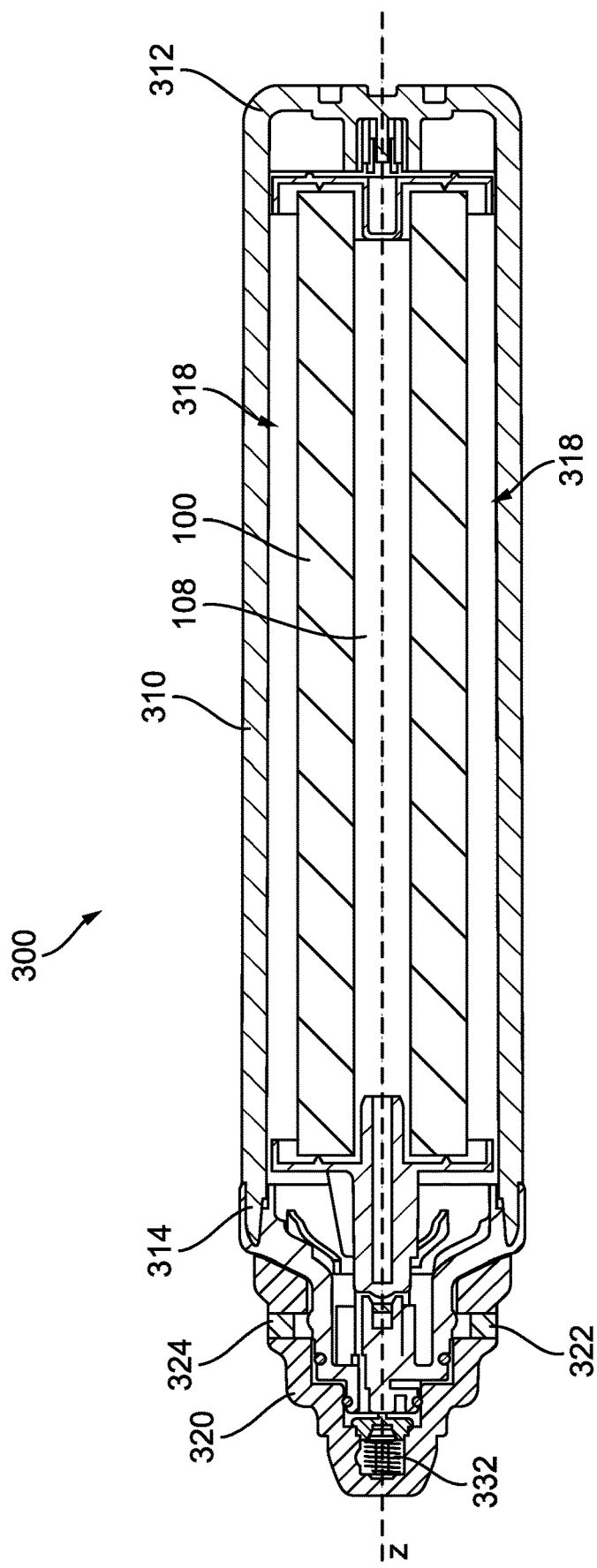
FIG. 9 shows a cross sectional view of the water filter of FIG. 8 as taken along line 9-9 in FIG. 8.

Some embodiments described herein relate to a water filter 300 as shown in FIGS. 8 and 9. Water filter 300 is similar to water filter 200 and includes a filter housing 310 and a head 320. Filter housing 310 may have a similar structure and features as described above with respect to filter housing 210 except filter cartridge 100 is sealed within filter housing 210. Head 320 may include a raw water inlet 322 and a purified water outlet 324. Raw water inlet 322 and purified water outlet 324 may each be arranged on a lateral side of head 320 and may be arranged on opposing sides of head 320. Thus, water may flow into head 320 in a direction perpendicular to longitudinal axis of water filter 300, and similarly water may exit head 320 in a direction perpendicular to longitudinal axis of water filter 300.

Water filter 300 may operate in a similar manner as water filter 200. Raw water to be filtered flows into head 320 through inlet 322 and flows through head 320 into housing 310 along flow channels 318 along inner wall 317 of housing 310. Water flows in a radial direction through filter cartridge 100 to a center portion 108 of filter cartridge 100. Water flows in a longitudinal direction from first end 312 of housing 310 toward second end 314. Water flows from filter cartridge 100 into head 320 and out of water filter 300 via purified water outlet 324.

Water filter 300 may similarly include one or more check valves 332. As shown in FIG. 9, water filter 300 includes a single check valve 332. Check valve 332 may prevent backflow of water through water filter 300. Check valve 332 may automatically open when filter housing 310 is inserted, and may automatically close when filter housing 310 is removed. The use of a single check valve may reduce the cost of the water filter 300 and may allow replacement of the filter cartridge using a twist-lock mechanism, such that the use of special tools is not required.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A water filter cartridge, comprising:
   a sediment filter;
   a carbon filter;
   a core comprising a tubular body defining a plurality of openings configured to allow water to flow through the core, wherein the core defines an open central area, and wherein the core supports the sediment filter and the carbon filter; and
   a nanofiltration unit arranged within the open central area of the core, wherein the nanofiltration unit comprises:
   a tubular filter element defining a central volume; and
   a plurality of filaments arranged within the central volume.

2. The water filter cartridge of claim 1, wherein the plurality of filaments comprises polyethersulfone.

3. The water filter cartridge of claim 1, wherein the sediment filter comprises a non-woven sediment filter.

4. The water filter cartridge of claim 1, wherein the sediment filter comprises activated alumina fibers.

5. The water filter cartridge of claim 1, wherein the carbon filter comprises a carbon block.

6. The water filter cartridge of claim 5, wherein the carbon block comprises catalytic carbon.

7. The water filter cartridge of claim 6, wherein the carbon block comprises kinetic degradation fluxion media.

8. The water filter cartridge of claim 1, further comprising a filter element comprising boehmite fibrils.

9. The water filter cartridge of claim 1, further comprising a wrapping disposed around at least a portion of the carbon filter.

10. The water filter cartridge of claim 1, wherein the core is separated from the nanofiltration unit by a gap.

11. The water filter cartridge of claim 1, wherein the sediment filter and the carbon filter are arranged in a nested configuration.

12. A water filter cartridge, comprising:
    an activated alumina fiber filter;
    a non-woven sediment filter;
    a carbon block comprising activated carbon;
    a core that supports the carbon block, the non-woven sediment filter, and the activated alumina fiber filter;
    a tubular filter element comprising a nanofiltration media that is arranged within the core; and
    a plurality of electrostatically charged filaments arranged within the tubular filter element and configured to separate contaminants by adsorption.

13. The water filter cartridge of claim 12, wherein the activated alumina fiber filter surrounds the non-woven sediment filter, and wherein the non-woven sediment filter surrounds the carbon block such that water flows through the activated alumina fiber filter to the non-woven sediment filter, and wherein the water flows through the non-woven sediment filter to the carbon block.

14. The water filter cartridge of claim 12, wherein each of the activated alumina fiber filter, the non-woven sediment filter, and the carbon block have tubular structures.

15. The water filter cartridge of claim 12, wherein each of the plurality of filaments comprises polyethersulfone.

16. The water filter cartridge of claim 12, wherein the carbon block comprises a wrapping around at least a portion of the carbon block.

17. The water filter cartridge of claim 12, wherein the carbon block comprises activated carbon, catalytic carbon, and a kinetic degradation fluxion media.

18. A water filter, comprising:
    a tubular housing having a first end that is closed opposite a second end that is open;
    a head removably secured at the second end of the tubular housing so as to enclose the second end, wherein the head comprises a raw water inlet and a purified water outlet; and
    a filter cartridge arranged within the tubular housing, wherein water is configured to flow into the tubular housing through the raw water inlet in a longitudinal direction of the tubular housing along an inner wall of the tubular housing, and flow through the water filter cartridge in a radial direction toward a center of the filter cartridge, and wherein the water flows out of the tubular housing in a longitudinal direction through the purified water outlet;
    wherein the filter cartridge comprises:
    a sediment filter;

a carbon filter; and
a nanofiltration unit comprising a tubular filter element defining a central volume, and a plurality of electrostatically charged filaments arranged within the central volume and configured to filter contaminants by adsorption.

19. The water filter of claim 18, wherein the head comprises a check-valve configured to prevent backflow of water.

20. The water filter of claim 18, wherein the filter cartridge is removably positioned within the tubular housing.

21. A scalable water filter cartridge, comprising:
a plurality of filter elements arranged in a nested configuration, wherein the plurality of water filter elements comprises a nanofiltration unit comprising a plurality of electrostatically charged filaments configured to chemically separate contaminants from raw water supplied to the water filter cartridge, and
wherein the water filter cartridge is configured to filter the raw water supplied to the water filter cartridge at a pressure of 30 psi to 40 psi, and with a water flow rate of 0.1 gallons per minute to 5 gallons per minute.

* * * * *